United States Patent [19]

Bullock et al.

[11] Patent Number: 5,703,471
[45] Date of Patent: Dec. 30, 1997

[54] BATTERY PROTECTION CIRCUITRY FOR LIMITING CHARGING PARAMETERS OF A BATTERY PLANT

[75] Inventors: Norma Kathryn Bullock, Rockwall, Tex.; Douglas G. Fent, San Mateo, Calif.

[73] Assignee: Lucent Technologies Inc., Murray Hill, N.J.

[21] Appl. No.: 616,063

[22] Filed: Mar. 11, 1996

[51] Int. Cl.[6] ............................................. H01M 10/46
[52] U.S. Cl. ........................................... 320/51; 320/35
[58] Field of Search ............................ 320/5, 9, 12, 21, 320/26, 30, 35, 36, 39, 40, 51

[56] References Cited

U.S. PATENT DOCUMENTS

| | | | |
|---|---|---|---|
| 3,852,652 | 12/1974 | Jasinski | 320/35 |
| 3,895,283 | 7/1975 | Peterson | 320/35 |
| 4,562,398 | 12/1985 | Kotlarewsky | 320/40 X |
| 5,204,611 | 4/1993 | Nor et al. | 320/35 X |
| 5,214,370 | 5/1993 | Harm et al. | 320/35 |
| 5,241,259 | 8/1993 | Patino et al. | 320/35 |

OTHER PUBLICATIONS

Looney, Chesley H. Jr., *Electronic Design*, "Schottky diodes rectify efficiently in a bicycle–lighting system," Circle No. 313, Jul. 5, 1997.

*Primary Examiner*—Edward Tso

[57] ABSTRACT

In an arrangement for charging a battery in a battery plant, a resistive network is situated in the charging path of a battery being charged to guarantee a minimum total resistance of the added resistance and the battery's internal resistance regardless of the thermal effect of reducing the battery's internal resistance. A diode path bypasses the resistive network during discharging of the battery to reduce power dissipation. Charging current is controlled in response to a temperature of a heat sink on which the resistive network is mounted. Ambient temperature is used as a control or in another arrangement as a controlling factor in controlling charging current. Battery temperature may also be used as a control or in another arrangement as a controlling factor in controlling charging current.

20 Claims, 2 Drawing Sheets

BATTERY PROTECTION CIRCUITRY FOR LIMITING CHARGING PARAMETERS OF A BATTERY PLANT

FIELD OF THE INVENTION

This invention relates to the charging of batteries included in a battery plant and in particular to circuitry to control the charging current in order to prevent degradation of the battery, decrease the amount of heat and/or harmful gases which are generated during charging and reduce the cost and energy required to operate the battery and regulate its environment.

BACKGROUND OF THE INVENTION

The charging current of a lead-acid battery must be regulated for several reasons. First, a portion of the charging current generates flammable hydrogen gas and oxygen. Excessive currents may also generate the toxic and flammable gas hydrogen sulfide (see R. S. Robinson, J. M. Tarascon and T. O'Sullivan, Proceedings of the Intelec 93, Paris, France (IEEE, 1993) p. 440). Second, regulating the current improves battery life by reducing the rates of the internal battery degradation mechanisms such as grid corrosion and growth and dry out. Third, in valve-regulated lead-acid batteries, the recombination of oxygen within the battery generates large amounts of heat which, if not dissipated at the generation rate, will increase the battery temperature. As the battery temperature increases, the effect of this increasing temperature is to reduce the internal current impedance in the battery leading to a further increase in the charging current and a further increase in internal temperature. Once this regenerative process has progressed to a thermal runaway condition, the battery may generate larger quantities of explosive gas mixtures than can be dissipated from the battery room or enclosure, leading to an unsafe environment.

Battery chargers are typically of two types, those that control the current and those that control the voltage. In many applications, such as the standby power applications in telecommunications and UPS systems, constant voltage float charging is used to maintain the standby battery in a full state of charge so that it can deliver power in the event of an ac power outage. It is simpler and less costly to charge the battery directly from the buss connecting the rectifier to the dc load than to design into the system a separate constant current charger for the battery string. However, because the current is essentially unlimited in these applications relative to the current that the battery can tolerate, excessive overcharging and thermal runaway are common problems. Existing control methods to prevent thermal runaway typically rely on monitoring a charging voltage and in some instances may monitor the battery temperature.

Two prior art battery-charging regulating mechanisms are discussed by Kathryn R. Bullock, Douglas G. Fent and Patrick K. Ng, in an article entitled "New Developments in Batteries for Fiber in the Loop Applications," in the Proceedings, Intelec 95, The Hague, Netherlands (IEEE, 1993), page 690. In one method a series resistor or active transistor is included in the battery charging path to limit charging current. A diode path provides a low discharge path for the battery. See also the article by G. H. Looney, Jr., entitled "Schottky diodes rectify efficiently in a bicycle-lighting system" in the magazine, Electronic Design, 5 Jul. 1977, vol. 25, no. 14, page 92. The methods described in the above prior art use a non-variable resistance which must be properly sized for each type of battery system. If a larger battery is installed, the size of the resistor must be increased to achieve the same limit of charging current. If a smaller battery is installed, the size of the resistor must be decreased to avoid increasing the battery recharge time after the battery is discharged. In another method, the battery temperature is monitored and used to control the rectifier output voltage used to charge the battery. The rectifier output voltage is reduced at a rate of 3 mV per degree C. battery temperature increase per cell in the battery string until the battery temperature reaches about 53 to 55 degrees C. The battery voltage is then held constant until the battery temperature reaches 75 degrees C., where the rectifier output voltage is dropped by 167 mV/cell in the battery string to a level below the open circuit voltage of the battery to arrest thermal runaway and a major alarm is issued. This method was first disclosed in an application filed by the applicants of this application Jun. 22, 1994; Ser. No. 08/263,971. Other methods are described in the Bellcore specification TR-NWT-0766.

It is often necessary to enclose batteries in confined spaces such as cabinets or vaults to ensure public safety and prevent unwanted tampering with the battery system. These enclosed spaces must be ventilated to remove generated gases and are sometimes cooled and/or heated to prolong battery life and improve battery performance. Controlling the charging current reduces the amount of ventilation required and permits insulation of the enclosure to increase the efficiency of the cooling and/or heating devices. Controlling the charging current thus reduces the energy and cost required both to operate these environmental control devices and to recharge the battery.

SUMMARY OF THE INVENTION

In an arrangement for charging a battery in a battery plant, the temperature of a resistive network situated in the charging path of a battery being charged or the temperature of the heat sink on which the resistive network is mounted is used to control the charging current to guarantee a minimum total impedance of the added resistance and the battery's internal impedance regardless of the thermal effect of reducing the battery's internal impedance. A diode path bypasses the resistive network during the discharging of the battery to reduce power dissipation. The charging current may be controlled in various ways. In one method, additional variable resistance is added to the resistive network as the sensed temperature increases. In another method, the sensed temperature of the resistive network is used to control the rectifier output voltage. In yet another method, the sensed temperature of the resistive network is used to control the environmental conditioning system of the battery room or enclosure. An advantage of this arrangement is that the system which controls the charging voltage of current does not require a sensor connected to the battery. Another advantage is that the device can be used with a range of battery sizes so that different sized batteries can be installed in the system without changing the current controlling device. Thus the device provides a fail-safe method independent of the battery type of controlling the charging current under conditions in which excessively high battery enclosure temperatures, and/or electronic fault modes and/or battery fault modes such as low battery voltage cause the charging current to increase.

In a particular embodiment, the temperature of the resistor network is sensed so as to control a variable resistive device, such as a FET device operated in its active linear region, which is connected in series with the resistive network to increase the charging path impedance as the temperature rises. The invention may be installed directly on the battery enclosure in series with the battery string between the battery charger and the load to protect the battery and reduce the ventilation and environmental control required to maintain a safe, efficiently regulated environment. In this particular embodiment, the invention may be installed independently of the type of charging system or the type of battery used.

In another embodiment the temperature of a heat sink, on which the resistive network is mounted, is used for control of the variable impedance device.

Other arrangements include controlling a charging voltage in response to the heat sink temperature or controlling the battery environment in response to the heat sink temperature.

In another instance a temperature differential between a system temperature and the temperature of the battery or battery enclosure environment is used to maintain a proper charging temperature.

DETAILED DESCRIPTION

Figure 2:
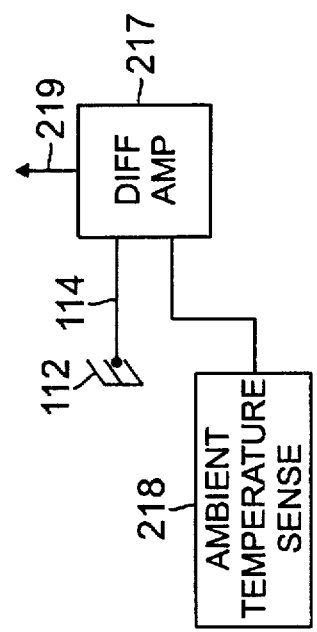
FIG. 2 and FIG. 3 show two temperature sensing arrangements alternative to that shown in FIG. 1.

In a schematic of a battery plant, AC line voltage is applied to a rectifier 104, via leads 101 and 102. The rectified DC voltage is coupled by the power rails 106 and 107 to a load 125. Shunted across the rails 106 and 107 is a battery 108 and a charging/discharging current path connected in series and the series connection connecting the two rails 106 and 107. The charging/discharging current path includes a resistor 109, mounted on a heat sink 112 and a FET device 120 connected in series and connecting the resistor 109 to the rail 106. A diode 110 connects the battery terminal to the rail 106 and is oriented to be forward biased when the battery is discharging.

A thermistor 114 is attached to the heat sink 112 and its output is connected to control chip 115 which in turn is connected to the control the conductivity of the FET device 120. The FET device is operated in its active "linear" mode and its impedance is increased, under control of chip 115, as the temperature of the heat sink increases.

Monitoring the heat sink temperature, on which the resistor 109 is mounted, has a faster response time than monitoring a resistor or battery case temperature. In addition the internal battery temperature may be different than that of the case, because of the battery's high heat capacity.

The use of temperature to adjust a series impedance and control the charging current is a fairly accurate method of control since the charging current is a function of battery temperature and voltage. The addition of a voltage control will improve the charging current control and may be used with or in place of the series impedance. Implementation of added voltage control is believed to be within the skill of those in the art.

While the embodiment above senses the temperature of the heat sink alone to control the charging current, it may be desirable to base the control on a temperature differential; for example between the heat sink temperature and ambient temperature.

Figure 1:
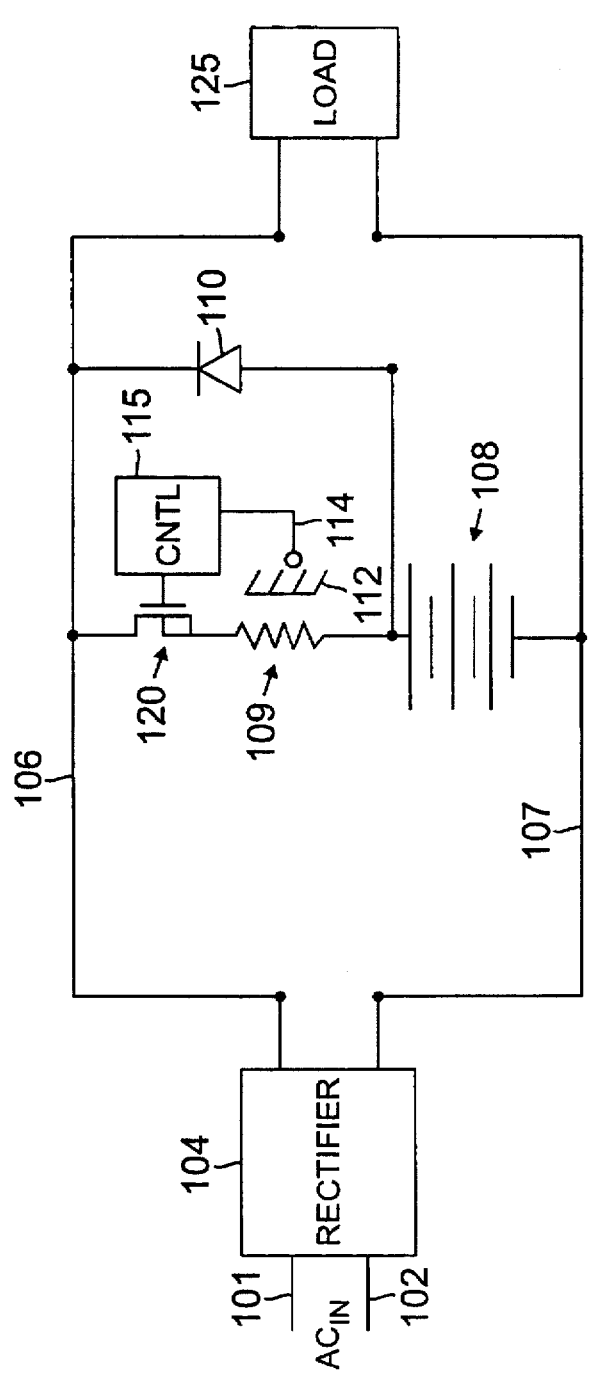
FIG. 1 discloses a battery plant including the protective circuitry included in the battery charging path to prevent battery overcharging and counter thermal runaway.

A sensing arrangement to measure such a differential temperature is shown in the FIG. 2. A temperature sensing thermistor 114 is connected to the heat sink 112. The thermistor 114 provides a temperature signal to a difference amplifier 217 and an ambient temperature sensor 218 monitors the immediate ambient temperature at the battery location. It produces a signal applied to the difference amplifier 218. The amplifier output, on lead 219, is applied to the control chip 115, as is done in FIG. 1, to achieve the desired voltage control and battery charging current.

Figure 3:
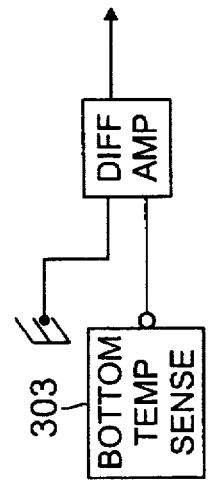

Battery temperature, as sensed by sensor 303, is used as one of the two differential temperatures as shown in the FIG. 3, from which the control is derived. Operation of the circuit otherwise is the same as as the circuit of FIG. 2.

Figure 4:
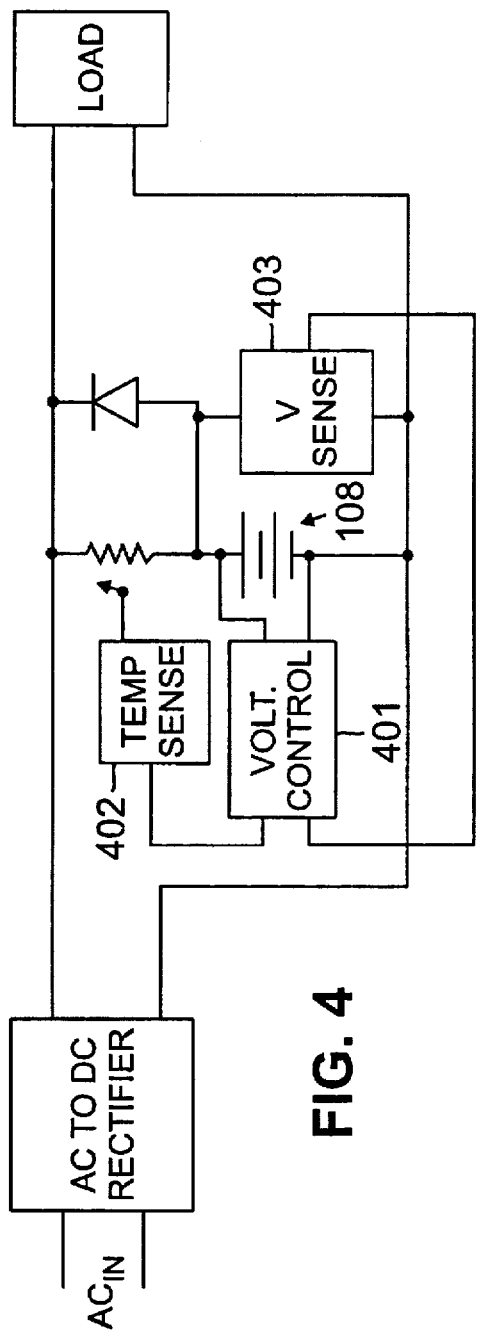
FIG. 4 shows a use of sensed temperature to control a charging voltage for charging the battery.

In FIG. 4 a voltage control 401 is shown for directly controlling a charging voltage of the battery 108. This control 401 is responsive to a temperature sensing circuit 402 and a battery charging voltage sensing circuit 403. The temperature sensing may take many forms such as those of FIGS. 1, 2 and 3 or other forms which will be obvious to those skilled in the art.

Figure 5:
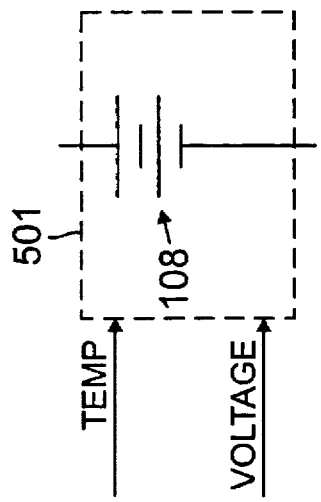
FIG. 5 shows a means of controlling temperature of the battery environment to prevent overcharging of the battery.

In FIG. 5 the battery 108 is included in a temperature controlled enclosure 501 such as an air conditioned enclosure or that of a heat pump or thermoelectric device. A sensed temperature of differential and a voltage is applied to the enclosure to control the enclosure temperature. Such temperature control may readily control the battery charging by preventing battery overheating from reducing its internal current resistance.

Figure 6:
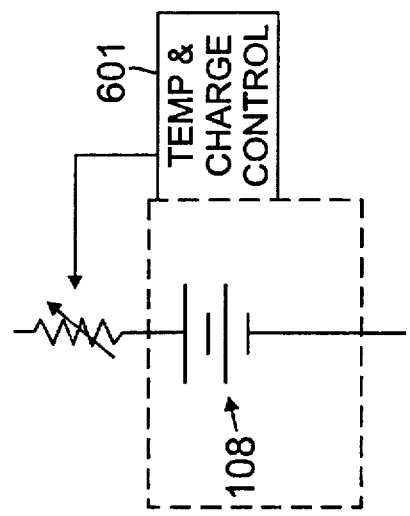
FIG. 6 shows an arrangement for mounting the charging current control within or on a battery enclosure to provide a fail-safe method of protecting the battery and enclosure from excess current.

In FIG. 6 a temperature controller or charging control device 601 is mounted on an enclosure, in which battery 108 is located, and provides a charging control to protect the enclosed battery 108 from over charging and the attendant temperature rise. By controlling the charging current in response to the heat sink temperature provides secure temperature control to protect the battery and the battery enclosure.

The invention claimed is:

1. In a circuit for charging a battery, a control circuit, comprising:
    means for applying a DC voltage to the battery; and
    means for controlling the DC voltage and a charging current applied to the battery, including:
        a resistive device connected to a battery terminal to limit charging current applied to the battery despite degeneration of internal battery resistance; and
        means for further limiting charging current in response to a measured temperature related to the resistive device.

2. The control circuit as recited in claim 1 wherein the means for controlling, further comprises:
    temperature sensing means connected to sense a temperature of a heat sink supporting the resistive device; and
    the means for further limiting includes a variable resistance connected in series with the battery and operated in response to the temperature sensing means.

3. The control circuit as recited in claim 1 wherein the means for controlling, further comprises:

temperature sensing means connected to sense a temperature of a heat sink supporting the resistive device, and an active FET device connected in series with the resistive device and operated in its active mode to adjust impedance to control the battery charging current.

4. The control circuit as recited in claim 3 wherein the means for controlling, further comprises:

means for controlling the active FET device impedance in response to the temperature of the heat sink.

5. The control circuit as recited in claim 4 wherein:

the temperature sensing means includes a thermistor; and the means for controlling the active FET device includes a chip controller.

6. The control circuit as recited in claim 5 wherein the means for controlling, further comprises:

a diode connected to bypass the resistive device and the active FET device and polarity oriented to conduct discharge currents of the battery.

7. The control circuit as recited in claim 5 wherein the means for controlling, further comprises:

means to determine a difference between the temperature of the heat sink and ambient temperature and using the difference temperature to apply to the chip controller.

8. The control circuit as recited in claim 5 wherein the means for controlling, further comprises:

means for controlling an ambient temperature of the battery in response to a temperature of the heat sink.

9. The control circuit as recited in claim 1 wherein the means for controlling further comprises an ambient battery enclosure temperature control device.

10. The control circuit as recited in claim 1 wherein the means for controlling further comprises a charging voltage control device.

11. The control circuit as recited in claim 1 wherein the means for controlling, further comprises:

a heat sink connected to support the resistive device; and means to determine a difference between the temperature of the heat sink and battery temperature and using the difference temperature to apply as a control input to the means for controlling.

12. The control circuit as recited in claim 1 wherein the means for controlling, further comprises:

a heat sink connected to support the resistive device; and means for determining a difference between the temperature of the heat sink and ambient temperature and using the difference temperature value to apply as a control input to the means for controlling.

13. The control circuit as recited in claim 1 wherein the means for controlling, further comprises:

a heat sink connected to support the resistive device; and means for controlling an environment temperature of the battery in response to a temperature of the heat sink.

14. The control circuit as recited in claim 1 wherein the means for controlling, further comprises:

a heat sink connected to support the resistive device;

means for enclosing the battery in an enclosure; and means for further limiting controlling current entering the enclosure to protect the battery.

15. In a battery plant having a battery floated across rails coupling an input rectifier to a load, an impedance network, comprising:

a first impedance element coupled to the battery; and a second impedance element, coupled to the first impedance element, that provides a variable impedance in response to a characteristic of the battery plant, the first and second impedance elements cooperating to limit a charging current to the battery.

16. The impedance network as recited in claim 15, further comprising:

a discharge path that bypasses the impedance network thereby providing a path to conduct a discharge current from the battery.

17. The impedance network as recited in claim 15 wherein the second impedance element is a switching device and the impedance network, further comprises:

a temperature sensing circuit that senses a temperature associated with the battery plant; and a controller that regulates the impedance of the switching device in response to the sensed temperature.

18. In a battery plant that includes a battery and an impedance element floated across rails coupling an input rectifier to a load, the battery plant further including a discharge path that bypasses the impedance element to conduct a discharge current from the battery, a circuit for monitoring a charge of the battery, comprising:

a controller that monitors a characteristic of the battery plant and provides a signal to the battery to regulate a charge thereacross.

19. The circuit as recited in claim 18 wherein the controller comprises a temperature sensing circuit that senses a temperature associated with the battery plant, the controller providing the signal in response to the sensed temperature.

20. The circuit as recited in claim 18 wherein the controller, comprises:

a temperature sensing circuit that senses a temperature associated with the battery plant;

a voltage sensing circuit that senses a voltage across the battery; and a voltage control circuit that provides the signal to the battery in response to the sensed temperature and sensed voltage.

* * * * *